United States Patent [19]
Frangullie

[11] 3,831,310
[45] Aug. 27, 1974

[54] LIVE BAIT BUCKET
[76] Inventor: George C. Frangullie, P.O. Box 950, Port Lavaca, Tex. 77979
[22] Filed: Mar. 8, 1973
[21] Appl. No.: 339,312

[52] U.S. Cl. .................................................. 43/56
[51] Int. Cl. ............................................. A01k 97/04
[58] Field of Search ......... 43/54.5, 55, 56, 57, 57.5; 119/2, 3, 5

[56] References Cited
UNITED STATES PATENTS
| 517,652 | 4/1894 | Mann | 119/2 |
|---|---|---|---|
| 2,243,498 | 5/1941 | Candioto | 43/56 |
| 2,767,509 | 10/1956 | Breithaupt | 43/57 |

Primary Examiner—Warner H. Camp
Attorney, Agent, or Firm—Roy H. Smith, Jr.

[57] ABSTRACT

To keep live bait from clustering together and thus shortening their lives, the bait bucket is divided into a number of bait storage compartments by means of spacers or partitions. The spacers preferably are perforated with a number of fluid-flow passages which are large enough to permit the flow of water, but are too small to permit the bait itself from passing between compartments. In addition, the bucket preferably includes a thermal compartment to provide some control over the temperature of the water in which the live bait is carried, a compartment that may be filled with ice in hot weather when the ambient temperature is low. An optional feature is an air stone or aerator in the bottom of the bait compartments, together with appropriate air tubing or passageways adapted for connection to a source of air.

5 Claims, 10 Drawing Figures

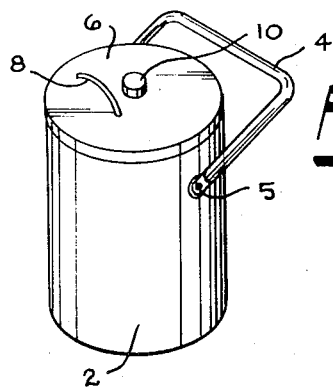
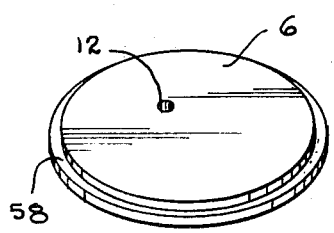
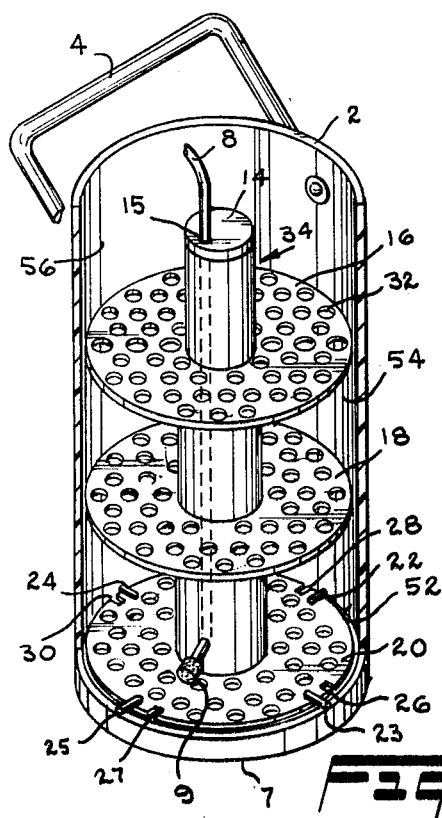
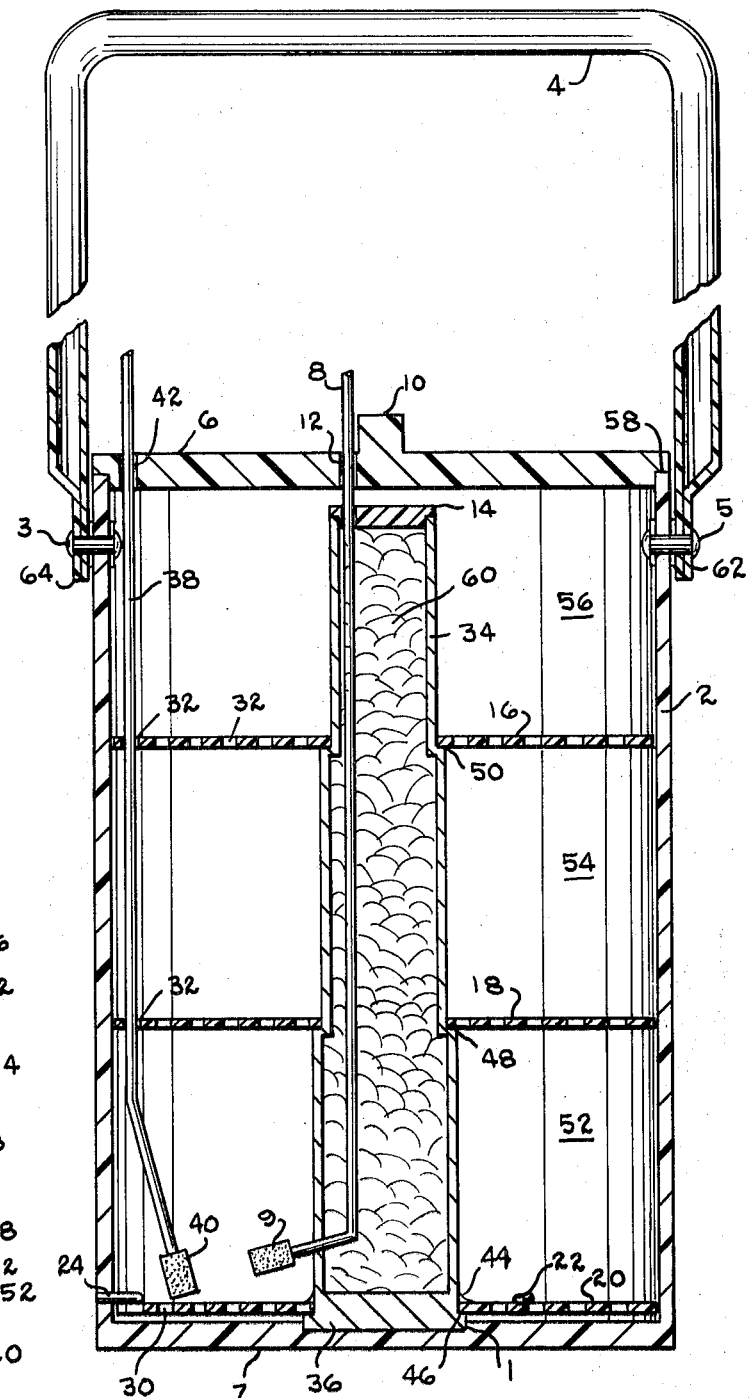

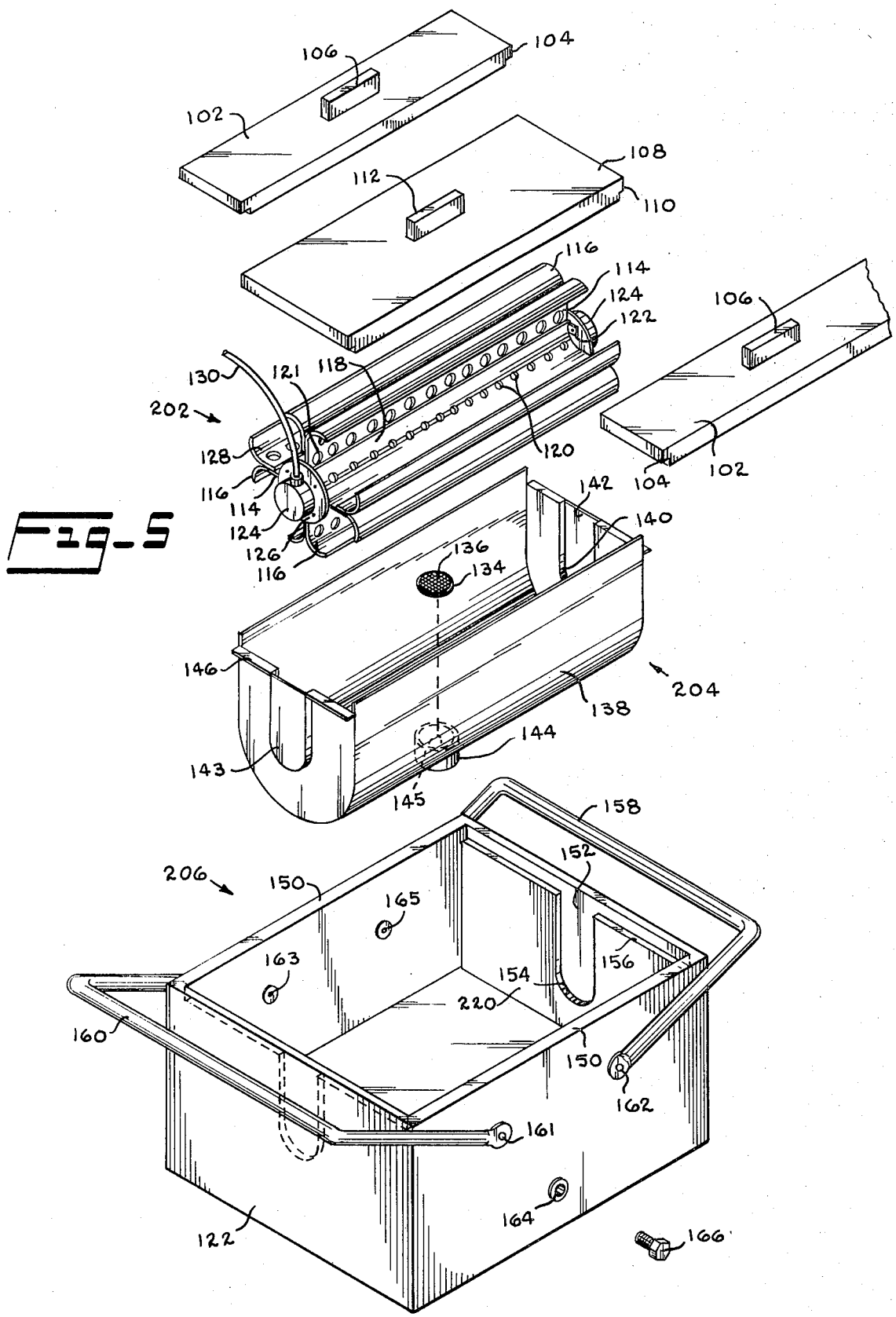

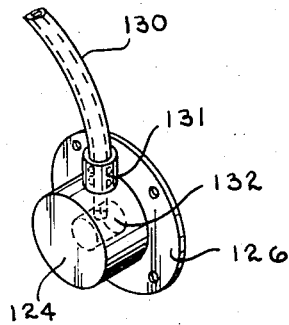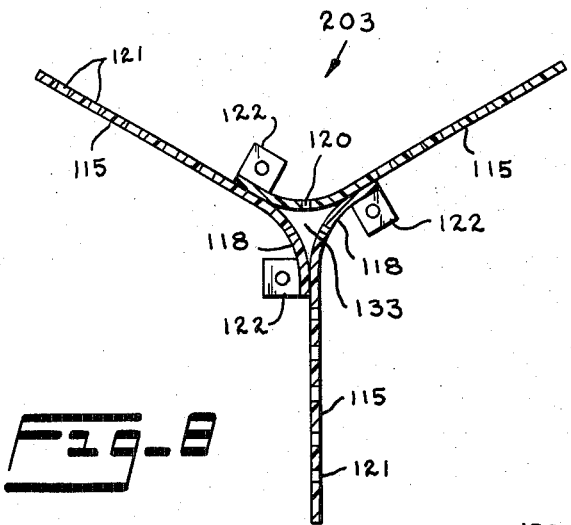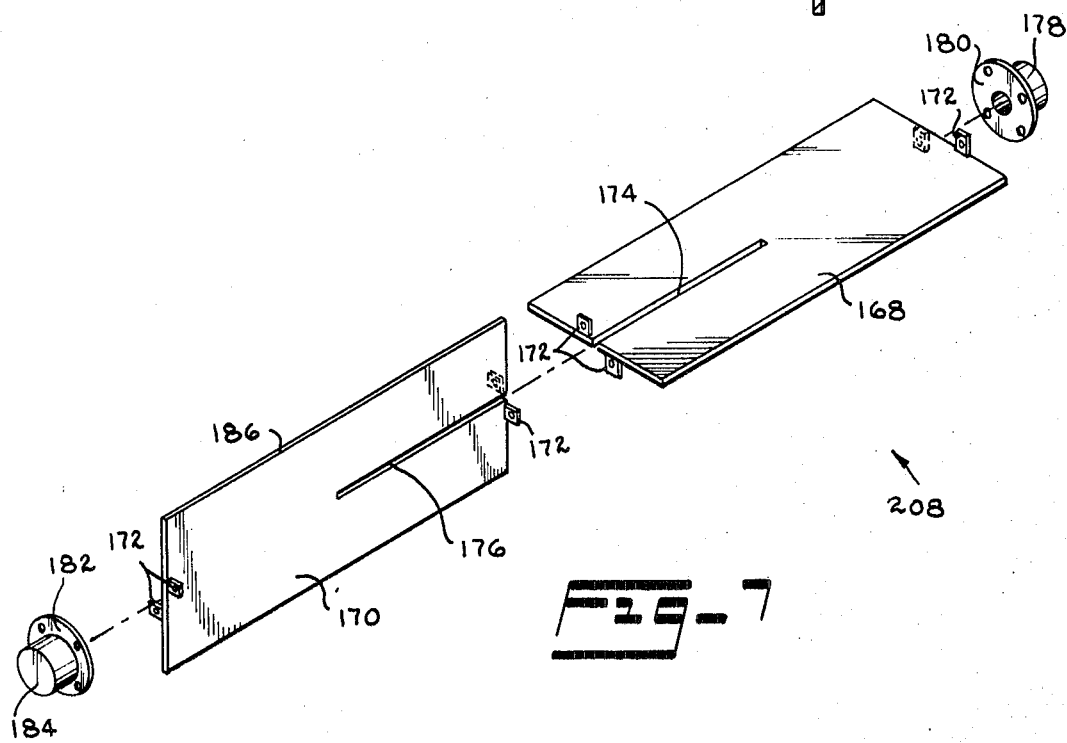

3,831,310

LIVE BAIT BUCKET

FIELD OF THE INVENTION

The field of the present invention is that of containers for the handling, transportation, protection, storage, and sustenance of live marine organisms. While particularly useful as bait buckets for fishermen, they may also be used by other persons dealing with marine animals such as shrimp, minnows, fingerlings and the like.

PRIOR ART

The prior art in the field of the present invention consists of many types of containers, most of which are designed simply to hold water and bait. In one type the bait is stored in an inner, perforated bucket which allows the water to drain into an outer bucket when the inner bucket is lifted, causing the bait to lie on the bottom to facilitate picking up a wiggling shrimp or minnow. A second type has the added feature of an ice compartment for cooling the water. Still a third type has an adjustable shutter for controlling heat transfer from an inner container to an outer ice container. Some of these utilize on insulation material for the outer container. Some also incorporate a means for aeration of the water such as an air pump and tubing, either with or without a means for distributing the air, such as an air stone. Such devices do not always accomplish the ultimate object of keeping the bait alive and healthy over extended periods of time. They have the serious disadvantage of providing in each bait bucket only a single compartment to receive the bait. All of the bait being carried must be placed in the single compartment. The animals congregate together, and for some unknown reason the crowding causes some of them to die prematurely, and the average life of all of them to be shortened. It is believed that one cause of death is cannibalization, and that this phenomenon becomes more pronounced as the bait density increases.

OBJECTS OF THE INVENTION

The principal object of the present invention is to provide a means of containing and transporting live bait animals which overcomes the disadvantages of the prior art.

Another object is to provide a means of compartmentalizing and dividing live bait into smaller, segregated groups.

A third object is to provide compartments for the separate storage of more than one type of bait, as for instance one or more types of minnows and/or shrimp, for ready access to the type desired.

A fourth object is to provide an ice container of novel design as an integral part of the bait bucket, to keep bait water cool on hot days by the use of ice as a coolant.

A fifth object is to provide such a bait bucket including novel means of utilizing a line from an air pump for aeration.

A sixth object is to provide a bait bucket which includes a means of stirring or causing the bait to move, thereby to prevent them from huddling together.

A seventh object is to provide a bait bucket including a means for access to individual compartments in which bait animals are stored.

An eigth object is to provide such a bait bucket which is insulated from outside temperatures.

A ninth object is to provide means of preventing bait from congregating in sharp corners by designing out some of the corners.

SHORT DESCRIPTION OF THE INVENTION

The above and other objects are achieved in the present invention by providing a live bait bucket in which the bait receiving volume is divided into two or more compartments. One form of the invention is a generally cylindrical bait bucket with removable circular spacer discs which divide the bait receiving volume into horizontally stacked compartments, one on top of the other. It is desirable to include a thermal compartment for ice or other cooling or heating material, and in the cylindrical bait container such compartment is conveniently disposed on the axis on the main cylindrical container, is substantially coextensive with it, and rests on the inner bottom surface of the main container. The ice container may take the from of a smaller diameter cylinder having steps on its outer surface to provide support for the spacer discs. The discs are made annular in form to fit over the ice container, and are preferably provided with a multiplicity of perforations which permit the flow of bait water but not the bait itself. Means are provided to prevent the ice container from floating in the bait water, and also the use of an air diffuser device such as an air stone or air screen, as will be more particularly described in connection with the exemplary embodiment shown in the drawing.

Another form of the invention has the general shape of a rectangular box or chest, supporting within itself a bait container having a semicircular bottom, the bait container being adapted to hold water and being spaced from the sidewalls of the chest to define ice compartments. A rotatable separator is disposed within the bait container, being journaled therin at the curved bottoms of a pair of vertical grooves in opposed end walls of the bait container. The separator has the form of two or more blades extending from a common axial connection and it is these blades, together with the wall of the bait container, which define separate compartments in which bait is stored. The separator is made rotatable simply to make all bait compartments available to the user solely by manual rotation of the blades, no motor being required. Again, the blades are preferably provided with many small perforations -- both to permit the flow of thermal water currents (without bait flow) and to make rotation easier. Various means may be provided to add diffused air to the bait compartments and other refinements may be added, as explained below in describing the embodiments of the invention shown in the drawing.

BRIEF DESCRIPTION OF THE DRAWING FIGURES

In the accompanying drawing which forms a part of the present application:

FIG. 1 is a perspective view of a first preferred embodiment, a cylindrical type bait bucket, fully assembled.

FIG. 2 is a perspective view of the cylindrical bait bucket of FIG. 1 in somewhat enlarged scale and with part of the outer wall broken away to show the center ice container and the separators of the bucket in position, and also showing a novel way to utilize an air line and air stone.

FIG. 3 shows the lid of the same bait bucket in an upside down position in order to show its retaining feature.

FIG. 4 shows a further enlarged cross section of the same embodiment, with the addition of a second air stone, the latter supplementing that shown in FIG. 2 although either one may be used alone, when aeration is found desirable.

FIG. 5 is an exploded perspective view of a second preferred embodiment having the general form of a rectangular chest. This view shows as principal parts a center lid, side lids, rotatable separator, water aerator screen, water and bait container, outer container or chest, and drain plug.

FIG. 6 is an enlarged detail of the separator of FIG. 5, showing the bearing with an attached air inlet tube.

FIG. 7 illustrates in exploded perspective form an alternate form of separator which may be used in the FIG. 5 chest bait bucket.

FIG. 8 is a cross section of a separator varying slightly from that shown in FIG. 5, specifically in having simple, square ends on the blades rather than the bifurcated ends of the exploded view, and in using three blades rather than four.

DETAILED DESCRIPTION OF THE DRAWING FIGURES

Figure 9:
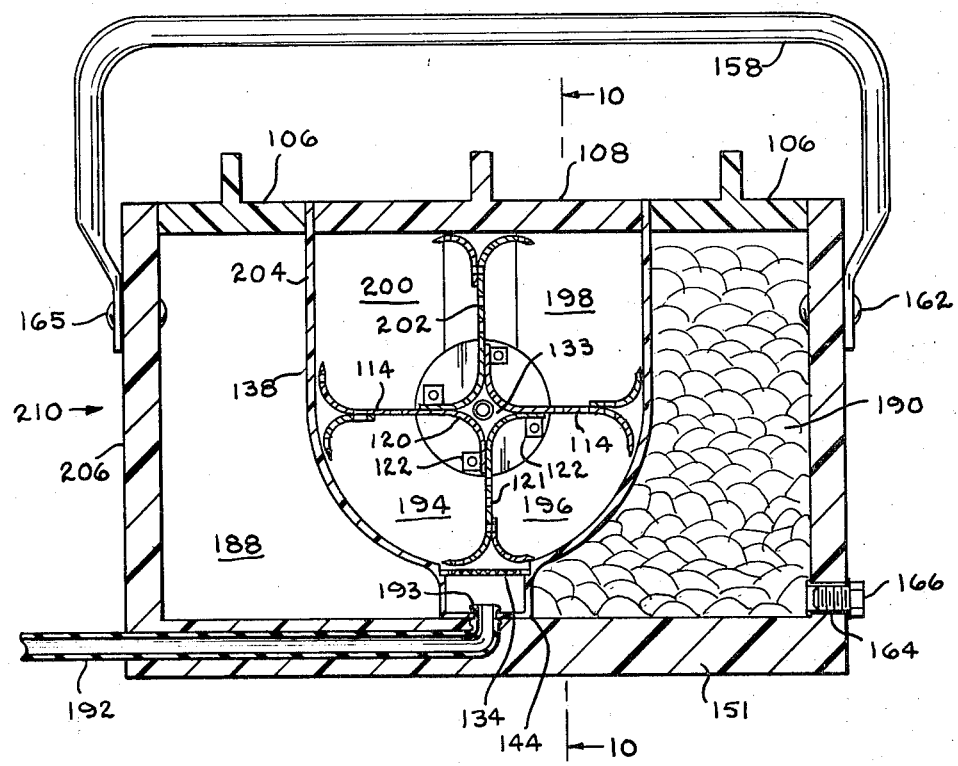
FIG. 9 is a cross section of the chest type bait container of FIG. 5.

FIG. 1 is an external perspective view of the cylindrical bait bucket of the present invention, in assembled form. It shows a cylindrical outer container 2 equipped with a lid 6 and a U-shaped handle 4 of bent rod or tubing attached by means of headed pins 5 passing through the wall of the container. The outer container 2 may be made of any convenient material such as metal, foamed plastic or transparent plastic, preferrably possessing insulation qualities to keep the inside at a cool and relatively constant temperature. The cap or lid 6 is desirably provided with a knob or small upward projection 10 on the top. Shown coming out of the cap 6 is an air supply line 8 which will be explained below.

FIG. 2 is an internal perspective view of the cylindrical bait bucket of FIG. 1 with the outer container wall 2 partially cut away to show the stepped thermal compartment 34. Most often, compartment 34 is used for ice storage to cool the water contained in the annular spaces 52, 54 and 56 defined between thermal compartment 34 and the outer wall 2 of the cylindrical bait bucket. The cool water, preferably maintained below 65 to 70° Farenheit, faciliatates keeping bait alive, especially minnows and shrimp. Air supply line 8 supplies air to air stone 9 to aerate the water, thus providing additional oxygen to keep the bait in better health.

Separator discs 16, 18 and 20 are spaced from each other to keep the bait separated into small groups for the purpose of preventing the bait, especially shrimp, from damaging each other (which may be by biting or cannibalization of each other which sometimes occurs when large groups huddle together). Lid 14 of the thermal container prevents water being splashed into ice compartment 34. An air supply line egress hole 15 allows air supply line 8 to pass to the bottom of the bucket through thermal container 34. Perforations 32 in separator discs 16, 18 and 20 are provided to facilitate thermal equalization of the water, and to allow water to drain away when any of the separator discs or container 34 is lifted upward relative to the outer container 2 in order to cause bait to lie on said separator discs to facilitate picking them up with the fingers. Perforations 32 in separator discs 16, 18 and 20 also facilitate diffusion of the tiny air bubbles discharged from air stone 9 throughout the water in each bait compartment. Anti-float pins 22, 23, 24 and 25 are to prevent flotation of thermal container 34 on any occasion when its loaded weight is less than the buoyant force acting on it. The bottom separator disc 20 is attached to the container 34 so that, when disc 20 is lowered to the bottom of cylindrical bait bucket 2, peripheral slots 26, 27, 28 and 30 in disc 20 register with pins 22–25 protruding inwardly from outer wall 2. The slots pass over the pins to permit disc 20 to reach its fully bottomed position below the pins, and disc 20, by virtue of its attachment to ice compartment 34, is rotated by rotating thermal container 34 from its top to bring slots 26, 27, 28 and 30 out of registry with the corresponding anti-float pins. This prevents upward movement of container 34 until it is desired to raise disc 20, in which event the procedure is reversed.

The entire cylindrical bait bucket is carried by handle 4, which can be rotated out of the way to obtain access to the bait.

FIG. 3 shows lid 6 of the cylindrical bait bucket in an inverted position in order to show shoulder of ledge 58 which in assembly is supported on the top edge of outer container 2. Its purpose is to prevent water and bait from being splashed out of the cylindrical bait bucket when being carried, and to provide insulation from outside temperatures. Also shown is a through hole 12 which provides a passage for air supply line 8 and prevents the exuded air bubbles from air stone 9 from building up pressure beneath lid 6.

FIG. 4 is a vertical section of an assembled cylindrical bait bucket of the present invention taken through the center. The steps 46, 48 and 50, formed between progressively smaller diameter portions of thermal compartment 34, support separator discs 20, 18 and 16 respectively. Separator disc 20 is shown attached to ice compartment 34 by means of connection 44, which may be solder or a weld in the case of metal construction, or adhesive in the event of plastic construction. A vertical tongue and groove fit may be used as a substitute. Ice compartment lid 14 is shown in position. Anti-float pins are shown at 22 through 25, and slots 26, 27, 28 and 30 are shown out of registry with any of the pins, so that disc 20 and thus container 34 are secured in place. Ice 60 is shown inside thermal compartment 34. Air supply line 8 and air stone 9 are also shown, as discussed in connection with FIG. 2. Also shown is a second system including an air stone 40 and an air supply line 38 passing through edge perforations 32 in separator discs 20, 18 and 16. Egress for air supply line 38 is provided by a through opening 42 in lid 6. Use of either or both aerator systems is optional; they may assist in keeping bait alive for a longer periods, but are not per se a part of the present invention.

The base of ice container 34 is an outwardly projecting flange 36 of the thermal container which is received in a recess 1 in the bottom wall 7 of outer container 2 to cause the ice compartment to stay centered within the cylindrical bait bucket. The shoulder 36 may also be used to support disc 20, as shown. Alternately the recess 1 and flange 36 could be threaded so that the ice compartment 34 could be screwed into the cylindrical bait bucket in order to prevent the aforementioned possibility of buoyancy causing flotation of thermal container 34. This would eliminate the need for the anti-float pins and the peripheral slots in the bottom separator disc 20; it would also eliminate the need for bottom disc 20, except as a convenience in making bait in bottom compartment 52 more conveniently available to the user. Compartments 52, 54 and 56 are to contain, restrain, and separate live bait to prevent them from clustering together in overly large numbers. The handle 4 is shown as a piece of bent tubing flattened at the ends 62 and 64 to serve as bearings for the pins 3 and 5 which pivotally secure the handle 4 to the sidewall 2 of the bucket. However, something other than tubing could be used for this handle. The lid 6 is shown with knob 10 and air supply line egress holes 42 and 12. Shoulder 58 is shown resting on top of cylindrical outer container 2. Similar construction is used in the fit of thermal container 34 and its cover 14.

Alternate structure may be used to support separator discs 16, 18 and 20 in the positions illustrated. One feasible means is a set of brackets or pins similar to pins 22–25 secured in the sidewall 2 below each disc. Since the discs support very little weight, such brackets or pins need not be very hefty, and hence need extend out of the sidewall only enough to catch and support the disc. If the sets of pins are circumferentially located in the exact location used for pins 22–25, and edge grooves are formed in middle disc 18 in locations identical to the locations of grooves 26, 27, 28 and 30, bottom disc 20 and middle disc 18 can readily be lowered into position. This construction would eliminate the need for providing steps on the outer surface of thermal container 34, reducing the cost of this part.

FIG. 5 is an exploded perspective view of a second preferred embodiment, a bait bucket in the form of a chest or rectangular box. From top to bottom the parts included are the lid 108 for the center or bait section of the outer container or ice chest 206, held in place by the fit of shoulder 110 to the upper edge of the sidewall of chest 206 and removed by pulling upward on the handle 112, and the pair of side lids 102 for the ice compartments of the chest and similarly held in place by shoulder 104 and removed by pulling upward on handle 106.

One of the major subassemblies of the chest type bucket is the rotatable separator 202, formed by attaching together three or more generally flat blades 114 by soldering, gluing, forming or riveting the inner bent ends 118 (see FIG. 9) to the adjacent blade. Each blade 114 has a curved outer edge 128 to which is secured a curved flange 116, thereby forming bifurcated blade ends. When the separator is seated in bait container 204, as shown in the cross section of FIG. 9, these bifurcated ends help to eliminate corners which could cause the bait to congregate. Construction of separator 202 is finished by attaching to each of the opposed ends of the set of blades a bearing 124 and its attached flange 126, utilizing ears 122 formed on the opposed ends of blades 114 and connecting members passing through aligned openings in the ears and bearing flanges. Bearings 124 rotatably support the separator 202 in bearing supports 140 formed in the ends of bait container 204 in such a manner that the separator can be rotated at will. The purpose of blades 114 is to divide bait container 202 into distinct compartments, as best seen in FIG. 9. The blades 114 are perforated to allow water to flow through them as they are turned. Air supply line 130 is provided to connect an external source of air pressure to the bearing 124. Air passageways within bearing 124 (not shown) are connected to the hollow space 133 at the center of the array of blades 114, which serves as a manifold for the distribution of air.

The auxiliary FIG. 6 shows the bearing 124 in an enlarged perspective view. It shows that air line 130 is connected to air inlet nipple 131 of the bearing, which in turn is connected to air inlet passageway 132 within bearing 124. Passageway 132 has its inner end open and registering with and flow connected to the outer end of aerator passageway 133 of blades 114, at the center of the array as shown in FIGS. 8 and 9. Aeration holes 120 and 121 are framed in the blades 114 for the purpose of distributing the air along the length of the separator 202. In an alternate construction not illustrated, only a limited number of aeration holes 120 would be used, and passageways connecting manifold channel 133 with the various bait compartments may be provided with nipples, air hoses and air stones to distribute air to the outer portions of each discrete bait compartment.

Auxiliary FIG. 8 shows some of the construction details of the rotatable separator, and some permissable variations. Shown is a cross section of a separator 203 having only three square-ended blades 115. The inner ends of the blades are joined to define an aerator passageway 133. Also shown are ears 122 which are the means of attachment to flange 126. Aerator holes are shown at 120.

The exploded view of FIG. 5 also shows an aerator screen 134 with its multiplicity of tiny holes 136. Where an aeration system is desired, screen 134 may be used as an alternative to the aerator previously described, or may supplement it. Screen 134 registers with and fits into air inlet box 144 in water and bait container 204.

Bait container 204 has a sidewall 138 with a semicircular bottom portion smoothly joined to a pair of opposed vertical wall portions. Separator bearing support 140 is formed as a part of separator bearing support socket 142. The entire container 204 is supported in outer container 206 by support ledge 146 and by aerator box 144 shown as an integral part of wall 138. The purpose of the bait container 204 is to hold water and bait, the latter being confined in the compartments 194, 196, 198 and 200 shown in FIG. 9. The sheet metal or plastic material of container 204 should be one that will readily transfer heat from the water it contains to the ice surrounding it on each side, as shown in FIG. 9, in order to keep the live bait at a cool, liveable temperature. Plug 145 is provided in case the aerator box is not used.

The outer container or ice chest itself is identified in its entirety by the numeral 206. In general form it is an open-topped rectangular box having four vertical walls 150 and a flat bottom 151. A pair of opposed walls 150 are modified to form the support shelves 156, which receive ledges 146, and the grooves 152 are formed downwardly from shelves 156, ending in semicircular journal supports 154. Grooves 152 receive the journal enclosures 143 of bait container 204, allowing the container 204 to be nested within outer container 206 until the ledge 146 comes to rest on support shelf 156 and journal 140 rests on journal support surface 154. Since the grooves 152 extend only partially through the thickness of end walls 150, this disposition prevents any endwise movements of bait container 204. The entire assembly is transported by carrying handles 160 and 158 which are formed of rod or tubing with ends flattened and restrained to walls 150 by pins 161, 162, 163 and 165 which extend through the flattened ends of handles 158 and 160 and through the walls of the chest 150. Means for draining water from the melted ice is provided in the form of a threaded plastic sleeve 164 cast integrally with a wall 150 and provided with a threaded plug 166. Although various materials may be used, it is preferred that chest 106 be made of material having superior heat insulation characteristics, e.g., Styrofoam, the better to retard entrance of outside heat on hot days and thus keep the contained bait from overheating.

FIG. 7 shows a modified form of rotatable separator 208, constructed somewhat differently from the separators shown in FIGS. 5 and 8. If differs in having two plates 168 and 170 each of which had a slot, 174 or 176 respectively, extending half the length of the plate and terminating in a square end. The plates are slipped over one another from the relative positions shown in the drawing, the resulting engagement forming a four bladed separator. It also differs from separator 202 of FIG. 5 by not having curved outer edges with attached flanges, and has no interior aerator passageway. Bearing 184 and attached flange 182 are attached to ears 172 at one end of the blade assembly, while a paired bearing 178 and its attached flange 180 are likewise attached to the blades at the opposite end. It will be noted that these bearings differ from bearings 124 of FIGS. 5 and 6 in not having an air inlet system. Aeration for this embodiment, is desired, may be provided through the aerator screen 134 shown in FIGS. 5, 9 and 10.

FIG. 9 shows a cross section of the assembled chest type live bait container, the overall assembly being indicated by the reference character 210, showing bifurcated separator 202 in place in the bait container 204 resting in place in the ice chest 206. The ice chest includes an air supply line 192 cast into the bottom wall 151 with the end 193 fitting into aerator box 144. This view shows how the combination of bait container 204 and either bifurcated separator 202 of FIG. 5 or one of the square ended separators 208 or 203 of FIGS. 7 and 8 cause a compartmentalization of the combined structure. The compartments are shown at 194, 196, 198 and 200. It is these rotatable compartments which keep small groups of live bait separated. Rotatability of the separators is mostly to make the bait in all compartments available to the user, although rotation also causes stirring of the bait to prevent huddling. Ice is stored in the side compartments 188 and 190, which are readily available to the user through lids 102, to provide cooling for the bait contained in the center compartments within bait container 204. Drain plug 166 is shown screwed into drain hole 164, and a carrying handle 158 is visible. The separator 202 would normally be turned by hand to bring the bait near the top for removal.

Figure 10:
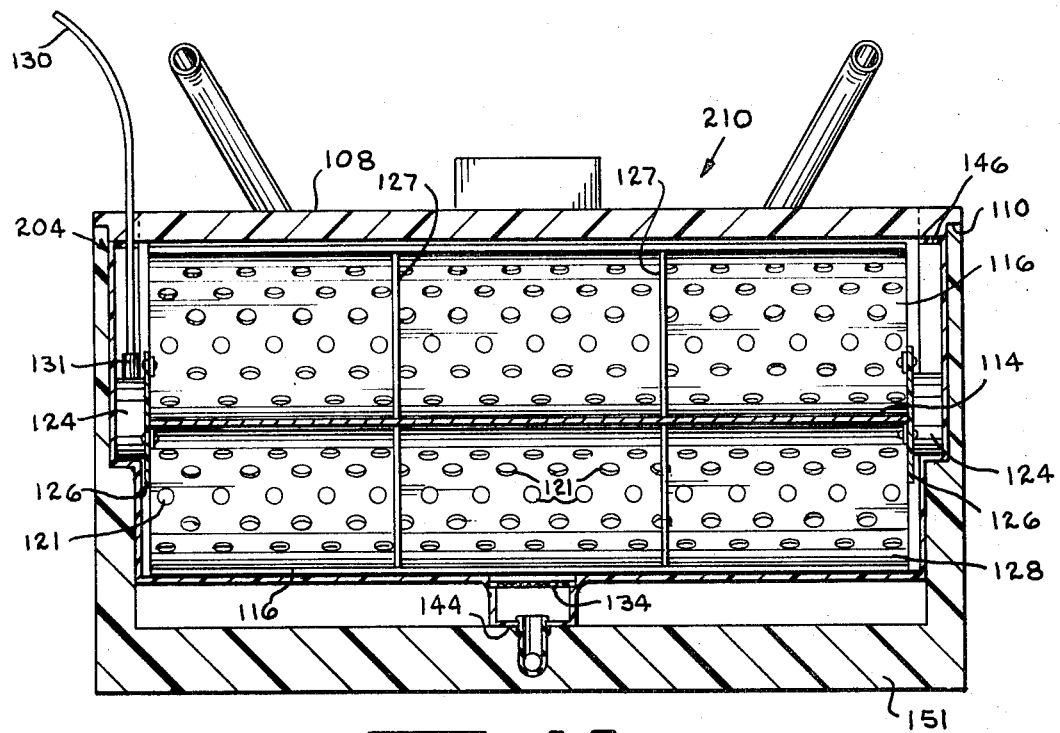
FIG. 10 is a longitudinal section of the same bait bucket, taken on lines and arrows 10—10 of FIG. 9, with a pair of circular plates added to show a further means for subdividing the bait storage volume, thus further illustrating the versatility of the invention.

FIG. 10 is a longitudinal section of the entire chest type bait container 210 of FIG. 9, taken slightly outward from center in order to better show the bifurcated separator ends 128 and curved flanges 116 of separator 202 of FIG. 5. This figure is included to show the method of support for bearing 124 and the engagement of bait container 206. The same engagement and support would be used for bearings 178 and 180 of separator 208 of FIG. 7. Also specifically identified for clarity are air inlet nipple 131 and air supply line 130, and alternate aeration box 144 and air screen 134 of bait container 204. Also shown are bearing flanges 126, center lid 108, and separator blade perforations 121.

Superimposed on FIG. 10 are a pair of additional spacer plates 127 which may be added to the rotatable separator 202 to further divide all or any number of the bait compartments 194, 196, 198 and 200 into three smaller compartments. These plates may be secured to blades 114 by any convenient technique, as by welding or adhesives, use of angle brackets, etc. It will be apparent that further divisions into yet small compartments may readily be accomplished.

GENERAL, INCLUDING ADVANTAGES

While the foregoing description illustrates particular forms of the invention, such forms are to be understood as only exemplary embodiments of the basic concept of the present invention, that of providing a compartmentalized structure in which live marine animals can be divided into segregated groups. Many other structures than those shown in the drawing figures and described in detail above are feasible, and the present invention embraces all such structures in which the bait receiving volume is divided into two or more discrete spaces in which shrimp, minnows and the like can be kept in separate groups.

One such form is a long rectangular tank in which compartments are formed by a series of removable partitions, either running longitudinally or transversely of the tank, or both, so that the bait container would resemble an overgrown ice cube tray. Insulation could be provided in the walls of the tank and, if necessary, in the partitions also. When deemed appropriate, ice compartments can be provided, or a number of selected compartments that otherwise would be filled with water and bait can be filled with ice. As with the embodiments described, various means can be provided for aerating the bait water, if desired.

The various forms of the invention all serve the basic purpose of providing a novel container for the storage and transportation of small marine animals, both bait and small fish which are to be used for such purposes as stocking a body of water. They keep the shrimp, minnows or other animals segregated into small groups, preferably by the use of walls or partitions which permit fluid flow but block the movement of the marine animals themselves. Thermal control is provided by separate compartments in which ice is provided to keep the bait water temperature at a healthy level, e.g., 60–65 F. in the case of shrimp (substituting hot water for ice on cold days). Various means are provided for aerating the bait water, the better to take advantage of every possible technique for prolonging the life of the bait.

What is claimed is:

1. A live bait bucket having generally vertical walls and a flat horizontal bottom, said wall and bottom being secured together in leakproof fashion, a vertically extending thermal container disposed within said bucket and supported on the bottom thereof, said thermal container being stepped to decreasingly smaller diameters from bottom to top to form upwardly facing shoulders, and a plurality of annular spacer discs supported on said shoulders and surrounding said thermal container, said spacer discs extending horizontally to fill the space between the outer surface of the thermal container and the inner surface of the bucket walls and being spaced from one another vertically to define a plurality of bait compartments.

2. A live bait bucket having generally vertical walls and a flat horizontal bottom, said wall and bottom being secured together in leakproof fashion, a vertically extending thermal container disposed within said bucket and supported on the bottom thereof, said thermal container being stepped to decreasingly smaller diameters from bottom to top to form upwardly facing shoulders, and a plurality of annular spacer discs supported on said shoulders and surrounding said thermal container, said spacer discs extending horizontally to fill the space between the outer surface of the thermal container and the inner surface of the bucket walls and being spaced from one another vertically to define a plurality of bait compartments, the lowermost of said spacer discs being secured to the lower end of the thermal container for common rotation therewith, said lowermost spacer disc having a number of peripheral notches therein too small to permit the passage of bait, and which includes a like number of anti-float pins fixed to the sidewalls of the bucket and projecting inwardly therefrom, said notches and pins being circumferentially disposed so that in one position they are aligned and the disc may be lowered to a position below the pins and in other positions to which the disc is rotated the pins and notches are misaligned, whereby the disc is secured against upward movement and holds the thermal container against flotation by water introduced into the bucket.

3. A live bait bucket comprising an outer container having the general form of a chest or rectangular box, a bait container capable of holding liquids disposed within the chest, secured to the ends thereof and spaced from the sidewalls thereof to define thermal compartments, said bait container having a semi-cylindrical bottom and having end walls with vertical grooves extending from the top of the container and terminating in semi-cylindrical journal surfaces, and a separator comprising a set of blades extending radially outwardly from a juncture along a common axis extending between the grooves of the bait container, and a bearing member secured to each end of the set of blades, said bearing members being of cylindrical configuration and receivable in the grooves of the bait container to be supported on the journal surfaces thereof, said blades and the semi-cylindrical bottom of the bait container cooperatively defining a plurality of bait compartments, the blades being manually rotatable to bring successive compartments within access of the user from the top of the chest.

4. The live bait bucket of claim 3 which includes a recess built into the bottom of said bait container, an air diffuser received in said recess without protruding upwardly into the space swept by said blades, and passageways through said chest for the connection of an air supply to said air diffuser.

5. A live bait bucket having an overall cylindrical shape and with a removable cylindrical thermal compartment of smaller diameter disposed at the center of the bucket, said thermal compartment having vertically spaced shoulders thereon and a number of annular spacer discs surrounding said thermal compartment and suported in vertically spaced relationship on said shoulders to divide the space within the bucket into a multiplicity of bait compartments of annular cross section stacked one on top of the other, said spacer discs being perforated to permit the flow of fluids but not the migration of live bait.

* * * * *